Feb. 28, 1967  C. O. GLASGOW  3,306,007
APPARATUS FOR SEPARATING OIL AND GAS FLUID STREAMS
Filed Feb. 19, 1964  3 Sheets-Sheet 1

INVENTOR.
CLARENCE O. GLASGOW
BY
Head & Johnson
ATTORNEYS

Feb. 28, 1967 C. O. GLASGOW 3,306,007
APPARATUS FOR SEPARATING OIL AND GAS FLUID STREAMS
Filed Feb. 19, 1964 3 Sheets-Sheet 2

INVENTOR.
CLARENCE O. GLASGOW
BY
*Head & Johnson*
ATTORNEYS

Feb. 28, 1967 C. O. GLASGOW 3,306,007
APPARATUS FOR SEPARATING OIL AND GAS FLUID STREAMS
Filed Feb. 19, 1964 3 Sheets-Sheet 3

INVENTOR.
CLARENCE O. GLASGOW
BY
Head & Johnson
ATTORNEYS

United States Patent Office 3,306,007
Patented Feb. 28, 1967

3,306,007
APPARATUS FOR SEPARATING OIL
AND GAS FLUID STREAMS
Clarence O. Glasgow, 2620 S. Yorktown,
Tulsa, Okla. 74114
Filed Feb. 19, 1964, Ser. No. 346,032
9 Claims. (Cl. 55—169)

This invention relates to apparatus for separating fluid mixtures. More specifically, the invention relates to an oil-gas separator providing a first step separation insulated from temperature differences exterior of the separator, and a final gas scrubbing step with pressure-loss reduction characteristics. The apparatus is directed towards reducing the rate of oil-gas foam formation within the separator, and primary and secondary foam storage steps therein to aid in the rate of foam decomposition to oil and gas.

In the art of oil-gas separation it is well known that as much as 90 percent, and sometimes more, of the gas and oil separation occurs in the first step. Subsequent separation steps, which usually include gas scrubbing steps and oil scrubbing steps, are dedicated towards scrubbing out free liquid drops entrained in the gas stream, free gas entrained in the foam and oil stream, and removal of bottom settlings and water.

The economic value of an oil-gas separator is found in its desired end results; i.e., liquids are undesirable in the gas outlet stream of a separator, if the gas is to be used as fuel, or if the gas is to be compressed. The liquid phase has greater economic value to the producer thereof if sold as liquid from a lease storage tank, rather than as additional volume in the gas outlet. Likewise, gas is undesirable in the liquid discharged from a separator because gas can be detrimental to downstream equipment such as liquid pumps, liquid meters, storage tanks, and to the quality of oil to be sold.

One very serious oil-gas separation problem is that of "foam." If oil-gas foam is not reduced to its components of oil and gas during its residence time in the separator, foam will build up and flow out of the separator with the gas stream, producing all of the ill results of having no separator at all.

If conditions are present condusive to the formation of foam, and the foam has not formed in well flow conductor ahead of the oil-gas separator, than, as a general rule, foam will foam only during the first separation step.

Generally, the temperature during the first separation step is very critical to the formation of foam; only a few degrees too cool and foam will form, many such critical temperatures lying between and to a lesser extent either side of a temperature range of 40 to 100 degrees Fahrenheit.

Atmospheric temperature conditions upon the conductive steel surfaces of an oil-gas separator greatly affect separation efficiency and the formation of foam.

Another very serious oil-gas separation problem is that of having an oil with paraffin-like base in the separator with its temperature below that at which the paraffin congeals, such temperature point known as the "cloud point" of the oil. When oil reaches its cloud point while in an oil-gas separator, it loses its fluid characteristics causing overflow through the gas outlet, or the unsafe condition of flow stoppage at the separator.

Gas scrubbing and pressure drop through the scrubbing steps work against one another. Gas must be impinged against surfaces to promote the entrained liquid clinging thereto, or reversal of direction of the gas must be had to promote the entrained liquid being deposited on surfaces, or the gas must be strained or filtered to remove liquid droplets, or some combination of these physical means employed to accomplish good gas scrubbing in an oil-gas separator. The design of a separator gas scrubbing element, then, must have pressure drop to accomplish its objective, but must be within limits, to maintain highest possible gas capacity of the scrubber unit.

In addition to conserving as much of the temperature of the well inlet fluid as is possible within the separator towards promoting faster resolution of foam, it is of much aid to provide controlled foam storage spaced and gas collection therefrom. Faster foam resolution means greater capacity in smaller space, an economic benefit, indeed, as oil-gas separators are sold in the market place based on their pressure chamber ratings and physical size, together with performance capacity.

Therefore it is an object of this invention to provide a fluid separator, particularly for oil and gas, which overcomes problems heretofore found in bridging the gap between theoretical and practical separator design.

A primary object of this invention is to provide an inner chamber in an oil-gas separator within which the first step of separation can take place, said inner chamber insulated from the pressure chamber.

Another object of this invention is to provide a final gas scrubbing element within the separator having an increase in gas scrubbing surface for greater scrubbing efficiency, yet said surface designed to reduce turbulence of the gas flow therethrough to obtain minimum pressure drop therethrough.

Another object of this invention is to provide an oil-gas separator constructed wherein an inner compartmented chamber, with its internals and appendages, is attached to the upper head portion of the separator pressure chamber, before assembly of the upper head portion with the rest of said pressure chamber.

Still another object of this invention is to provide an oil-gas separation apparatus having primary and secondary foam storage steps with defined oil and gas draw-off and collector steps therefrom.

Other objects, and advantages of the present invention will become readily apparent from the following detailed description of the invention with specific references to the accompanying drawings in which.

Figure 2:
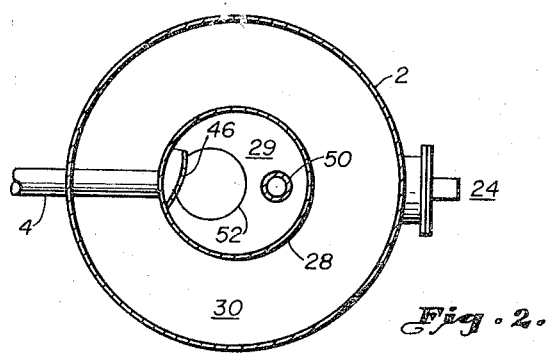
FIGURE 2 is a plan view in cross section taken at sectional line 2—2 in FIGURE 1.

In describing the preferred embodiment of the invention selected for illustration in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Figure 1:
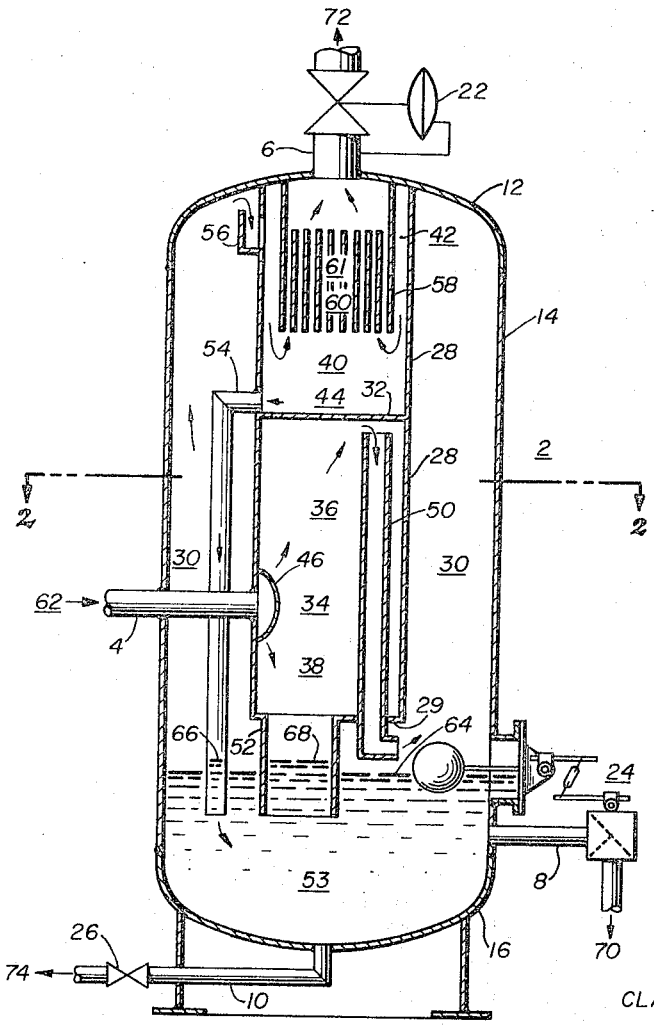
FIGURE 1 is an elevation view in cross section, of a vertical oil-gas separator embodying the present invention.
Figure 3:
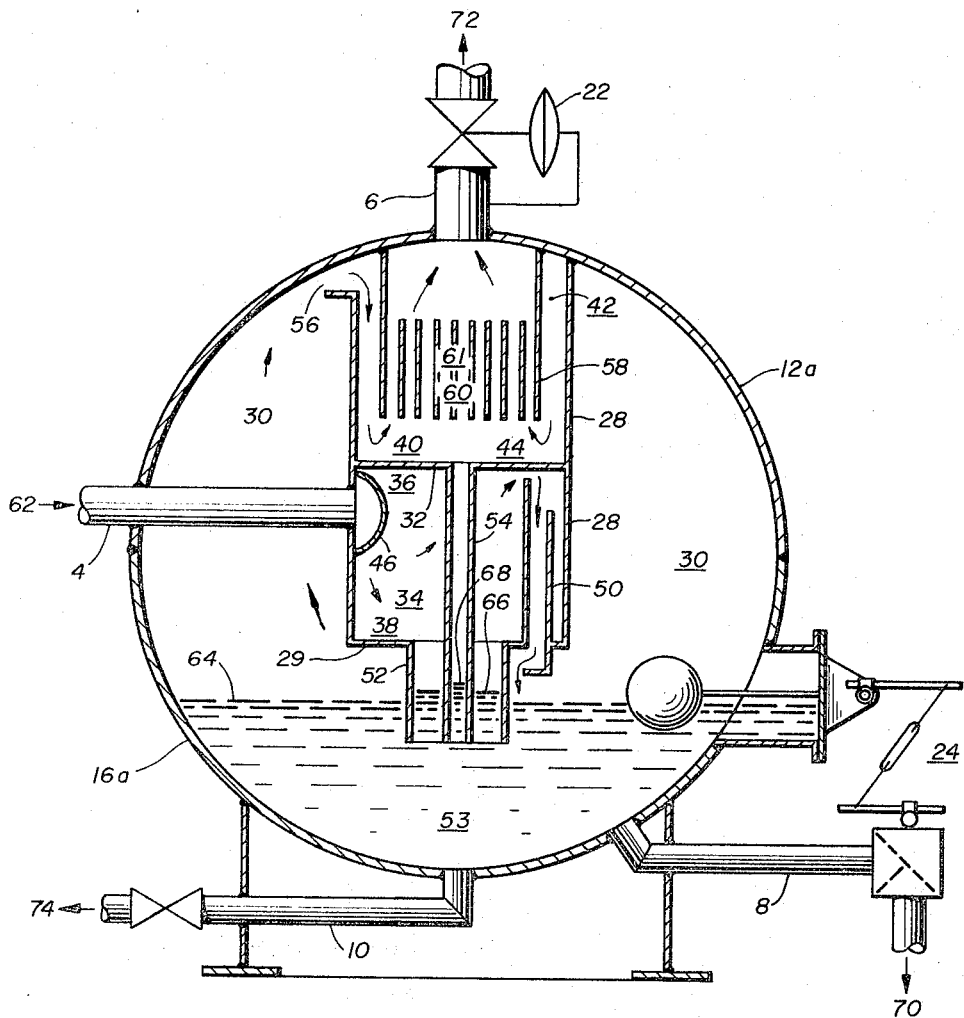
FIGURE 3 is an elevation view in cross section of a spherical oil-gas separator embodying the present invention.
Figure 4:
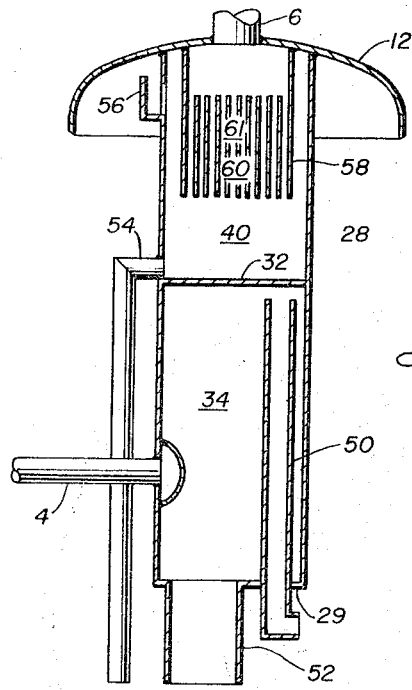
FIGURE 4 is an elevation view of the inner compartmented chamber with its internals and appendages attached to the upper head portion of a vertical separator.
Figure 5:
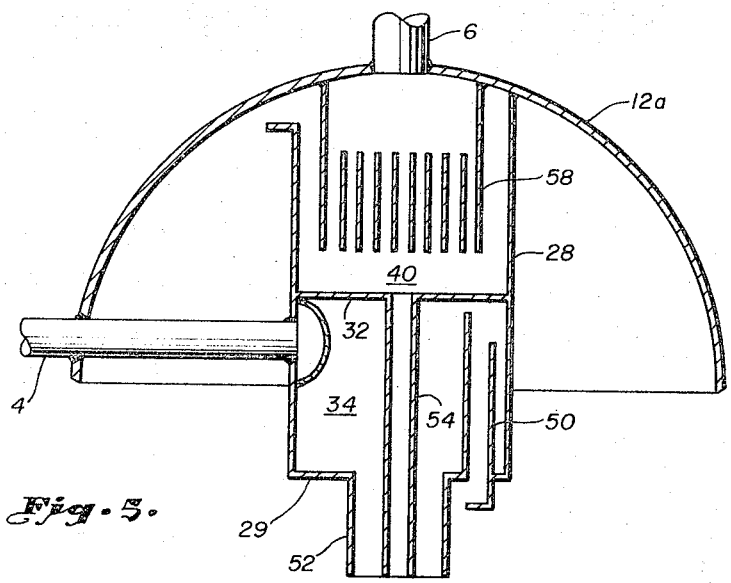
FIGURE 5 is an elevation view in cross section of the inner compartmented chamber with its internals and appendages attached to the upper head portion of a spherical separator.

Turning now to the specific embodiment of the invention selected for illustration in the drawings, the number 2 in FIGURE 1 is a separator pressure chamber manufactured usually in accord with Section VIII of the American Society of Mechanical Engineers (ASME) Unfired Pressure Vessel Fabrication Code as to materials, service, openings, connections, testing and welder qualifications, as is spherical separator pressure chamber 2a, in FIGURE 3.

The vertical type separator illustrated in FIGURE 1 having oil-gas separator pressure chamber 2 has cylindrical shell portion 14 with pipe or nozzle connections 4 and 8 being well fluid inlet conductor 4 and liquid outlet conductor 8; pressure retaining upper head portion 12 having therein a pipe or nozzle connection being gas outlet conductor 6; and pressure retaining lower head portion 16 having therein a pipe or nozzle connection being drain conductor 10. Also, there are other necessary connections into the pressure chamber in addition to those for the oil-gas level control means 24 for maintaining suitable operation level in the pressure chamber, pressure chamber gas pressure control means 22, and drain valve 26 on drain conductor 10; but it is of no value to list them here or show them in the drawings. Not noted on the drawings, but identified in the written description are the surfaces of pressure chamber 2 being interior surface 18 and exterior surface 20.

The principal elements of the structure internal of pressure chamber 2 are: inner compartmented chamber 28 having partition 32 forming thereby first inner chamber 34 and second inner chamber 40; final gas scrubbing compartment 58 having final gas scrubbing surface 61 said surface being multiplicity of passageways 60 each typically having a hydraulic radius falling within the range of $1/1000''$ through $25/100''$; suitable gas draw-off means 50 and 56, and suitable oil draw-off means 52 and 54.

Inner compartmented chamber 28 has end closure 29 penetrated by oil draw-off means 52 and gas draw-off means 50. Said chamber 28 is spaced within separator chamber 2 and 2a to form annulus 30.

Partition 32 divides inner compartmented chamber 28 into first inner chamber 34 having upper portion 36 and lower portion 38, and second inner chamber 40 having upper portion 42 and lower portion 44.

Said well fluid inlet conductor 4 penetrates shell portion 14, traverses annulus 30 and penetrates first inner chamber 34. Covering substantially the penetration into first inner chamber 34 is inlet fluid diverter means 46 attached to the interior wall of said first inner chamber 34.

Oil-gas level control means 24 maintains an oil-gas interface 64 in the lower portion of pressure chamber 2. Below the oil-gas interface 64 is oil storage portion 53. Oil draw-off means 54 from lower portion 44 of second inner chamber 40 penetrates oil storage portion 53 thereby creating oil seal 66. Oil draw-off means 52 from lower portion 38 of first inner chamber 38 penetrates oil storage portion 53 thereby creating oil seal 68.

Well fluid process stream 62 has as components in the ratio as produced, foam process stream (not noted on the drawings), oil process steam 70, gas process stream 72, and bottom settlings and water steam 74.

The spherical type separator is illustrated in FIGURE 3. The nomenclature and reference numbers are the same for the spherical separator as for the vertical separator in FIGURE 1, except that spherical separator of FIGURE 3 has pressure chamber 2, has no shell portion 14, has hemispherical upper head portion 12a, hemispherical lower head portion 16a; and well fluid inlet conductor 4 penetrates hemispherical upper head portion 12a.

In operation the oil-gas separator will have a well fluid process stream 62 having components in the ratio as produced from oil wells; oil, gas, foam, water and extraneous materials the solids of which are identified as bottom settlings. All of the well fluid process stream makes entry into the separator pressure chamber 2 through well fluid inlet conductor 4 releasing the well fluid process stream in first inner chamber 34, the flow of which is directed against the interior wall by inlet fluid diverter means 46. By operation of gravitational forces oil process stream 70 will exit first inner chamber 34 by way of oil draw-off means 52, through oil seal 68 into oil storage portion 53 and exit the separator pressure chamber 2 by way of liquid outlet conductor 8 as governed by oil-gas interface 64 level control means 24.

The released gas process stream 72 will be withdrawn from upper portion 36 of first inner chamber 34 by way of gas draw-off means 50 and released in annulus 30 near oil-gas interface 64.

The gas process stream 72 will travel upwardly through annulus 30, be drawn off through gas draw-off means 56 into second inner chamber 40 acting as a gas collector step.

The gas process stream 72 will then enter final gas scrubbing compartment 58 through a multiplicity of passageways 60 having final scrubbing surface 61, and exiting the separator pressure chamber by way of gas outlet conductor 6.

Liquids scrubbed from gas process stream 72 after said stream passes through gas draw-off means 56 are collected in lower portion 44 of second inner chamber 40 from whence they leave by way of oil draw-off means 54 passing through oil-seal 66 and into oil storage portion 53 of the separator.

Foam may or may not be present in the well fluid process stream 62, and may or may not be formed at the exit of inlet fluid diverter means 46, but when present will first collect in first inner chamber 34 wherein the first step of separation occurs and will accumulate in a primary foam storage step such storage volume being identified in the drawings as bounded by oil-seal 68, oil draw-off means 52, first inner chamber 34 to the top of gas draw-off means 50 in the upper portion 36 of said first inner chamber 34, excluding only gas and oil channels therethrough to their respective draw-off means.

Providing residence time in the first inner chamber, being insulated from temperature differences exterior the separator pressure chamber 2, by gas-filled annulus 30, and in the presence of the relative warmth of well fluid inlet stream 62, foam process stream (not noted on the drawings) will decompose at its fastest possible natural rate into oil and gas thereby joining oil process stream 70 and gas process stream 72.

However, if the foam formation rate in first inner chamber 34 be greater than the foam decomposition rate in said chamber, then there will be an overflowing of the foam process stream with the gas process stream 72 through gas draw-off means 50 into annulus 30. In such event annulus 30 becomes a secondary foam storage step for foam process stream. The secondary foam storage volume is identified in the drawings as bounded by interface 64 at the bottom, the annulus 30 and having height to gas draw-off means 56. Said secondary storage step provides additional residence time for the decomposition of foam process stream 69 into gas and oil.

Bottom settlings and water 74 are collected in oil storage portion 53 and being heavier than oil will settle over and around drain conductor 10 and can be drawn off by periodic operation of drain valve 26.

It is to be understood that the form of the invention herewith shown and described is to be taken as a preferred embodiment. Various changes may be made in the shape, size and arrangement of parts and portions. For instance, well fluid inlet conductor 4 could penetrate first one of the head portions of pressure chamber 2, then traverse annulus 30 to penetrate first inner chamber 34 at inlet fluid diverter means 46; or inlet conductor 4 could penetrate first the lower head portion 16 then penetrate first inner chamber 34 by way of oil draw-off means 52 and releasing well fluid process stream 62 approximately midway up first inner chamber 24. Oil draw-off means 52 could well be of the same size as first inner chamber 34. Gas draw-off means 50 could well be a conductor exterior first inner chamber 34 in annulus 30, but penetrating first inner chamber 34 at its uppermost portion and conducting said gas to near interface 64 in annulus 30. First inner chamber 34 could be larger or smaller than second inner chamber 40. Partition 32 need not be horizontal and well could be stair-stepped, so long as a closed partition between first and second inner chambers, 34 and 40, is presented. Annulus space 30 can be eccentric.

What is claimed is:

1. An oil-gas separator for oil and gas well fluid comprising the combination of;
   a pressure chamber;
   means to maintain a constant oil-gas interface in the lower portion of said chamber;
   a first substantially enclosed inner chamber within said pressure chamber positioned above said oil-gas interface to form an annulus;
   oil draw-off means extending from said first inner chamber to beneath said oil-gas interface to maintain an oil seal upon said draw-off means;
   well fluid inlet conductor means penetrating across said annulus into said inner chamber, to release said oil and gas well fluids internal of said first inner chamber;
   separate gas draw-off means within said first inner chamber to discharge gas from said first inner chamber above said well fluid inlet conductor means into said annulus at a point below said well fluid inlet conductor means, yet above said oil-gas interface;
   gas outlet conductor means above said first inner chamber to withdraw said gas from said annulus;
   an oil storage portion beneath said oil-gas interface; and
   oil outlet conductor means to withdraw said oil from said oil storage portion.

2. An oil-gas separator, as set forth in claim 1; and
   a gas scrubber means between said gas draw-off means from said first inner chamber, and said gas outlet conductor means from the upper portion of said pressure chamber.

3. An oil-gas separator, as set forth in claim 2; and
   an inlet means to said gas scrubber means having a multiplicity of passageways of a size each having a hydraulic radius falling within the range of 1/1000" through 25/100".

4. An oil-gas separator for oil and gas well fluids comprising the combination of;
   a pressure chamber;
   means to maintain a constant oil-gas interface in the lower portion of said pressure chamber;
   an inner substantially enclosed compartmented chamber within said pressure chamber positioned above said oil-gas interface to form an annulus;
   a partition in said compartmented chamber forming a first inner chamber in the lower portion and a second inner chamber in the upper portion of said compartmented chamber;
   well fluid inlet conductor means pentrating across said annulus into said inner chamber, to release said oil and gas well fluids internal of said first inner chamber;
   gas draw-off means to discharge gas from said first inner chamber above said well fluid inlet conductor means into said annulus at a point below said well fluid inlet conductor means, yet above said oil-gas interface;
   oil draw-off means extending from said first inner chamber to beneath said oil-gas interface to maintain an oil seal upon said draw-off means;
   gas draw-off means from said annulus penerating said second inner chamber in the upper portion thereof, to conduct gas and its oil droplets into second inner chamber;
   oil draw-off means from said second inner chamber discharging below said oil-gas interface to maintain an oil seal upon said oil draw-off means;
   gas outlet conductor means to withdraw said gas from said second inner chamber through said pressure chamber;
   an oil storage portion beneath said oil-gas interface; and
   oil outlet conductor means to withdraw said oil from said oil storage portion.

5. An oil-gas separator, as set forth in claim 4; and
   a gas scrubber means interposed in said gas stream within said second inner chamber.

6. An oil-gas separator, as set forth in claim 5; and
   an inlet means to said gas scrubber means having a multiplicity of passageways of a size each having a hydraulic radius falling within the range of 1/1000" through 25/100".

7. An oil-gas separator for oil and gas well fluids comprising the combination of;
   a vertically cylindrical pressure chamber;
   means to maintain a constant oil-gas interface in the lower portion of said pressure chamber;
   a vertically cylindrical enclosed inner chamber within said pressure chamber positioned above said oil-gas interface to form an annulus between said inner chamber and said pressure chamber, said inner chamber affixed to the upper portion of said pressure chamber;
   a partition across said vertical inner chamber forming a first inner chamber in the lower portion and a second inner chamber in the upper portion of said vertical inner chamber;
   well fluid inlet conductor means penetrating said first inner chamber to release said oil and gas well fluids internal of said first inner chamber;
   gas draw-off means to discharge gas from said first inner chamber above said well fluid inlet conductor means into said annulus at a point below said well fluid inlet conductor means, yet above said oil-gas interface;
   oil draw-off means extending from said first inner chamber to beneath said oil-gas interface to maintain an oil seal upon said draw-off means;
   gas draw-off means from said annulus penerating said second inner chamber in the upper portion thereof, to conduct gas and entrained oil droplets into second inner chamber;
   oil draw-off means from said second inner chamber discharging below said oil-gas interface to maintain an oil seal upon said oil draw-off means;
   a cylindrical vertically disposed final gas scrubbing compartment spaced within said second inner chamber and affixed continuously around said final compartment at the upper end thereof to the upper portion of said vertical pressure chamber;
   an inlet means to said final gas scrubbing compartment having a multiplicity of passageways, each passageway having a hydraulic radius falling within the range of 1/1000" through 25/100", and said passageways being disposed in said inlet means in vertical position;
   gas outlet conductor means to withdraw said gas from said final gas scrubbing compartment through said pressure chamber;
   an oil storage portion beneath said oil-gas interface; and
   an oil outlet conductor means to withdraw said oil from said oil storage portion.

8. An oil-gas separator for oil and gas well fluids comprising the combination of;
   a spherical pressure chamber;
   means to maintain a constant oil-gas interface in the lower portion of said pressure chamber;
   a cylindrical vertically disposed enclosed inner chamber within said spherical pressure chamber positioned above said oil-gas interface to form a variable width annulus between said inner chamber and said pressure chamber, said inner chamber affixed at its upper end to said pressure chamber;
   a partition across said vertical inner chamber forming a first inner chamber in the lower portion and a second inner chamber in the upper portion of said vertical inner chamber;

well fluid inlet conductor means penetrating said first inner chamber to release said oil and gas well fluids internal of said first inner chamber;

gas draw-off means to discharge gas from said first inner chamber above said well fluid inlet conductor means into said annulus at a point below said well fluid inlet conductor means, yet above said oil-gas interface;

oil draw-off means extending from said first inner chamber to beneath said oil-gas interface to maintain an oil seal upon said draw-off means;

gas draw-off means from said annulus penetrating said second inner chamber in the upper portion thereof, to conduct gas and entrained droplets of said oil into said second inner chamber;

oil draw-off means from said second inner chamber discharging below said oil-gas interface to maintain an oil seal upon said oil draw-off means;

a cylindrical vertically disposed final gas scrubbing compartment spaced within said second inner chamber and affixed at the upper end thereof to the upper portion of said spherical pressure chamber;

an inlet means to said final gas scrubbing compartment having a multiplicity of passageways, each passageway having a hydraulic radius falling within the range of 1/1000" through 25/100", and said passageways being disposed in said inlet means in vertical position;

gas outlet conductor means to withdraw said gas from said final gas scrubbing compartment through said pressure chamber;

an oil storage portion beneath said oil-gas interface; and an oil outlet conductor means to withdraw said oil from said oil storage portion.

9. An oil-gas separator internal structure for oil and gas well fluids comprising the combination of;

an oil-gas separator pressure chamber upper head portion;

a gas outlet conductor pipe penetrating the central part of said upper head portion;

a cylindrical chamber affixed to and enclosed thereby at the top by said upper head portion and enclosed at the bottom end, said chamber being substantially larger in diameter than said gas conductor pipe, yet smaller in diameter than said upper head portion and as long as at least half the diameter of said upper head portion;

a partition across said cylindrical chamber in the mid-portion thereof forming a first inner chamber in the lower portion and a second inner chamber in the upper portion of said cylindrical chamber;

a well fluid pipe conductor penetrating said first inner chamber in the mid-portion thereof;

a gas draw-off conductor pipe having its entrance end above said well fluid pipe conductor and within said first inner chamber, and having its discharge end exterior said first inner chamber and below said well fluid pipe conductor;

an oil draw-off conductor pipe from the bottom end of said first inner chamber;

an oil draw-off conductor pipe from the bottom portion of said second inner chamber extending from said second inner chamber to beneath said first inner chamber the same distance, substantially, as said oil draw-off conductor pipe from said first inner chamber;

gas draw-off means from exterior said second inner chamber penetrating said second inner chamber in the upper portion thereof, to conduct said gas and entrained droplets of said oil into said second inner chamber;

a cylindrical vertically disposed final gas scrubbing compartment spaced within said second inner chamber and affixed at the upper end thereof to said pressure chamber upper head portion; having said gas outlet conductor pipe therethrough; and an inlet means to said final gas scrubbing compartment having a multiplicity of passageways, each passageway having a hydraulic radius falling within the range of 1/1000" through 25/100", and said passageways being disposed in said inlet means in vertical position.

References Cited by the Examiner

UNITED STATES PATENTS

| | | | |
|---|---|---|---|
| 1,512,358 | 10/1924 | Neill | 55—168 |
| 1,923,598 | 8/1933 | Walker | 55—51 |
| 2,349,944 | 5/1944 | Dixon | 55—278 |
| 2,678,699 | 5/1954 | Fowler | 55—173 |
| 2,765,045 | 10/1956 | Meyers | 55—51 |
| 2,788,080 | 4/1957 | Guarin | 55—183 |
| 3,064,410 | 11/1962 | Wright | 55—168 |
| 3,119,674 | 1/1964 | Glasgow et al. | 55—51 |

REUBEN FRIEDMAN, *Primary Examiner.*

C. HART, *Assistant Examiner.*